(No Model.)
W. A. WAGNER.
CULTIVATOR.
No. 491,822. Patented Feb. 14, 1893.
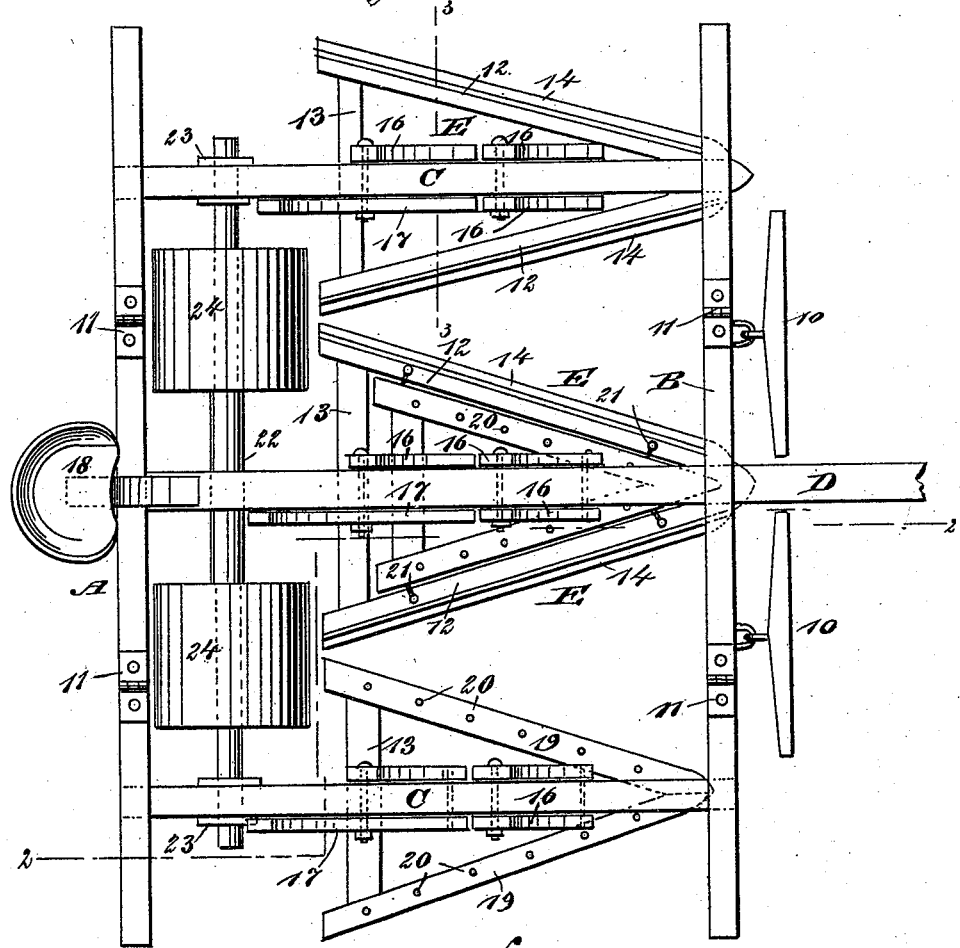
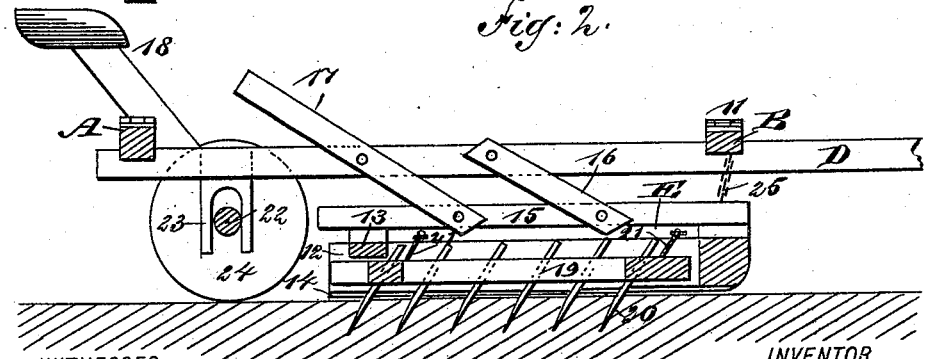
WITNESSES:
Chas. Nida.
C. Sedgwick
INVENTOR
W. A. Wagner
BY Munn & Co
ATTORNEYS.

UNITED STATES PATENT OFFICE.

WILLIAM A. WAGNER, OF CENTRAL CITY, IOWA.

CULTIVATOR.

SPECIFICATION forming part of Letters Patent No. 491,822, dated February 14, 1893.

Application filed July 26, 1892. Serial No. 441,277. (No model.)

*To all whom it may concern:*

Be it known that I, WILLIAM A. WAGNER, of Central City, in the county of Linn and State of Iowa, have invented a new and useful Improvement in Cultivators, of which the following is a full, clear, and exact description.

My invention relates to an improvement in cultivators and has for its object to provide a cultivator especially adapted for the cultivation of corn, and an object of the invention is to produce a machine provided with one or with a series of separators adapted to divide and remove the clods from over the rows of planted corn, and likewise adapted to remove from the rows weeds, rubbish, &c.

A further object of the invention is to provide each separator with a readily detachable harrow whereby the ground cleaned by the separators may be cultivated by the harrows, and as the separators throw the clods, weeds and rubbish between the rows the machine is provided with rollers located at the back of and between the separators, which rollers crush the clods and weeds, and force the latter and the rubbish into the ground.

A further object of the invention is to provide a means whereby the frame carrying the separators and harrows may be made in sections, and the sections so united that the machine will accommodate itself to the undulations in the ground.

It is another object of the invention to provide for the removal of the harrows from the separators in order that the former may be used without the separators when desired.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a plan view of the machine; Fig. 2 is a transverse section taken practically on the line 2—2 of Fig. 1; and Fig. 3 is a vertical transverse section taken through one of the separators, as indicated by the line 3—3 of Fig. 1.

The frame of the machine consists of a back beam A, a front beam B and side beams C, connecting the front and rear beams, the pole D, being located at the center of the frame, and it extends from the back to the front and beyond the front, the singletrees 10 being located one at each side of the pole, and attached to the front beam B. The front and rear beams A and B, are preferably made in sections, three sections being usually employed, a central and two side sections, and the sections are connected by hinges 11, the hinges being so placed that the end sections may be carried upward, and when they are in their lowermost position the sections of the front and rear beams will be in longitudinal alignment. The side beams C, connect the end sections of the front and rear beams, while the tongue or pole serves to connect the central sections of the frame.

In connection with the frame separators E, are employed. The separators are of like construction, and are of somewhat triangular shape. They comprise side pieces 12, which side pieces are brought together and connected at one end and diverge at their opposite ends, thereby forming in plan view somewhat the shape of the letter V; and at their diverging ends the side pieces 12 are connected by a cross bar 13.

Each side piece is provided with an exterior metal plate 14, securely attached thereto, and these plates extend downward below the lower edges of the side beams 12, as shown in Fig. 3, and at their lower extremities the plates are outwardly-curved.

A longitudinal central bar 15, is secured to each separator at the back and at the front and in any suitable or approved manner; and this central bar 15, is connected with either the tongue or the side bars C of the frame, according to the portion of the frame beneath which the separator is located, the connection being effected through the medium of links 16, pivotally attached to the sides of the central upper beam of the separators and to the sides of their upper supports. One of the rear links is usually carried upward, as shown at 17 in the drawings, to form a lever, whereby the driver from the seat 18 upon the rear of the tongue, may raise or lower the separators as occasion may demand.

Any approved adjusting mechanism may be employed, for instance, springs bearing against the links to maintain the separators in a desired lower position; and the levers may be provided with racks, whereby the separators may be held out of engagement with the ground when the machine is to be taken from one field to another, or to or from a field, or when the machine is to turn a corner.

Each separator is made of sufficient size to have fitted in it between its sides a harrow frame 19, of a shape corresponding to that of the separator; and the harrow frame is provided with teeth 20, of any approved construction. The harrow frame is held in position within the separator by means of cords or chains 21, attached to the harrow frame and to the upper portion of the separator beneath which the frame is located, or links or the equivalents thereof may be employed for this purpose instead of the cords or chains.

The separators are placed with their contracted ends facing the front of the machine; and back of the saparators a shaft 22, is journaled in the frame, the main bearings being attached to the pole; and the end bearings of the shaft consist of hangers 23 pendent from the side beams of the frame, the hangers being so constructed as to permit the end sections of the frame to move upward and downward without affecting the position of the shaft; and this shaft 22, carries rollers 24, and these rollers are located one opposite the space intervening two adjacent separators. Thus in the operation of this form of the machine, which is intended to cultivate the ground over the rows of lately planted corn, the machine is driven forward, the separators being pointed over the rows, and practically three rows will be cultivated at once, as the separators will carry clods of earth, weeds and rubbish from over the rows and will direct this refuse matter between the rows, leaving the ground smooth and clear for the harrow teeth carried by the separators, and the rollers 24, will crush the clods of earth and weeds that have been delivered between the rows, and will bury in the ground said weeds and rubbish. By this means a field of newly planted corn may be cultivated in a superior manner, and after the corn has appeared above the ground the rows may be cultivated by removing the separators, attaching to the links the harrow frames and causing said frames to travel between the rows of corn, at which time the shaft 22 and the rollers are removed; or any one of the harrows, or any one harrow and separator may be used singly, if in practice it is found desirable.

The front portions of the harrows, or the front portions of the separators are usually connected with the front beam of the frame by means of chains 25, as illustrated in Fig. 2.

Having thus described my invention, I claim as new, and desire to secure by Letters Patent,—

1. In a cultivator, the combination, with a frame constructed in sections, the said sections having a hinged connection, of triangularly-shaped separators suspended from the cross bars of the sections of the frame, one alongside of the other, the said separators being provided with side plates inclined downward and outward, harrow frames removably located within the separators, teeth carried by the frames, and an adjustable link connection between the separators and the cross bars of the frame sections, as and for the purpose specified.

2. In a cultivator, the combination, with a frame constructed in sections, the sections having hinged connection and provided with cross bars, of separators located beneath the cross bars, the separators being essentially of triangular shape, their contracted ends facing forward, plates secured to the outer side surfaces of the separators and inclined downwardly and outwardly, the lower ends of the plates extending below the lower edges of the side pieces and having an outward curve, harrow frames removably secured within the separators, adjustable link connections between the separators and the cross bars of the frame, a shaft carried by the sections of the frame and located back of the separators, and rollers located upon the shaft, one immediately opposite the space intervening each two separators, as and for the purpose set forth.

WILLIAM A. WAGNER.

Witnesses:
H. K. MEEKER,
M. M. GILLILAN.